Sept. 21, 1926. 1,600,298
E. G. PETERSON
DIRIGIBLE BALLOON AND AEROPLANE FOR TRANSPORTING
PEOPLE, EXPRESS, AND FREIGHT
Filed March 15, 1926 3 Sheets-Sheet 3

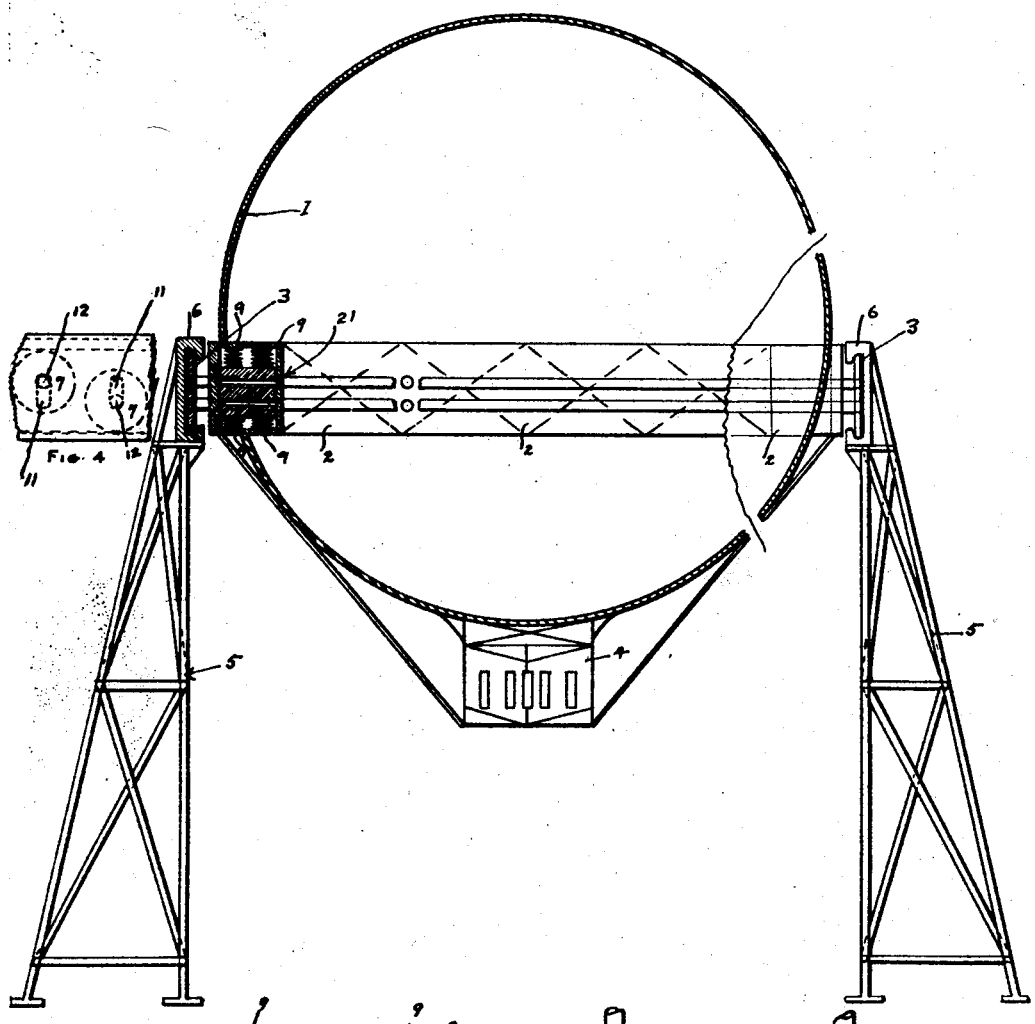

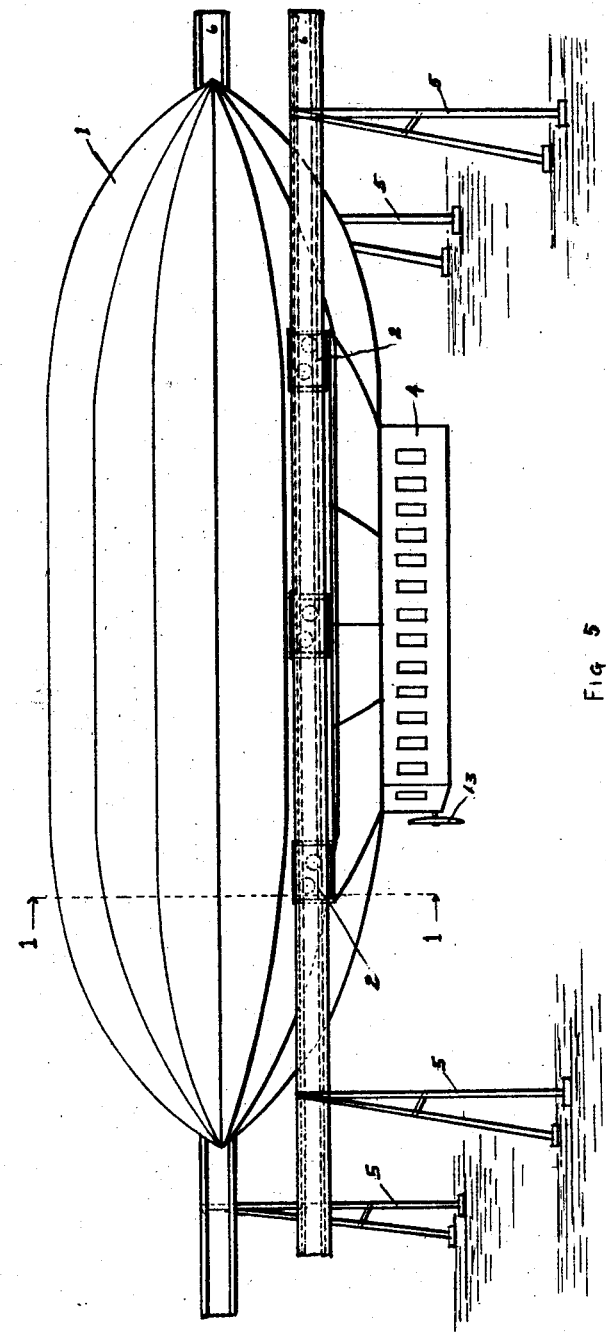

Inventor.
Elmer George Peterson

Patented Sept. 21, 1926.

1,600,298

UNITED STATES PATENT OFFICE.

ELMER GEORGE PETERSON, OF LOGAN, UTAH.

DIRIGIBLE BALLOON AND AEROPLANE FOR TRANSPORTING PEOPLE, EXPRESS, AND FREIGHT.

Application filed March 15, 1926. Serial No. 94,832.

My invention relates to improvements in combined aeronautic and rail means for transportation.

The primary object of my invention is to overcome the heavy weight factor in rail transportation and to overcome the hazard of aerial transportation by ballon, dirigible balloon, or aeroplane, as they now exist.

A further object of the invention is to provide a system of transportation by means of which the beneficial and desirable factors of rail and aerial transportation are combined.

Other objects and advantages will become apparent as the description proceeds.

I attain the objects mentioned in the foregoing paragraphs by the mechanism illustrated in the accompanying drawings, in which—

Figure 6:
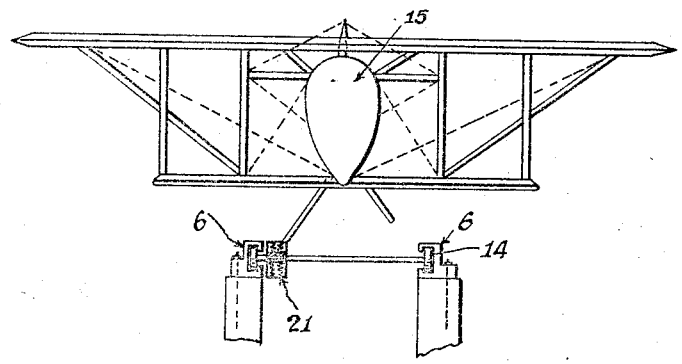
Figure 7:
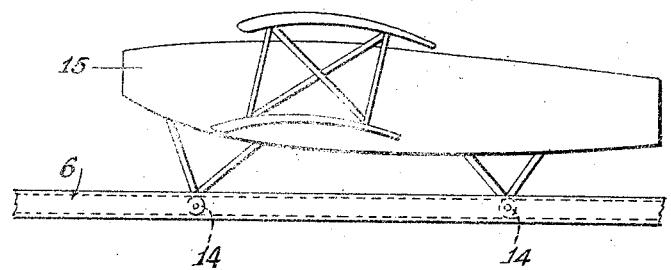
Figure 8:
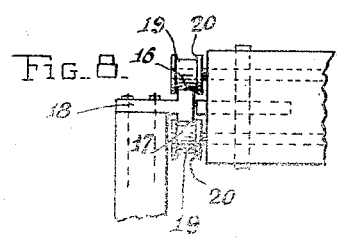

Figure 1 is a vertical sectional view of one form of my invention, taken on line 1—1 of Figure 5, Figures 2, 3, and 4 are detailed elevational views of rail and associated truck structures embodying the invention, Figure 5 is a side elevational view of the structure shown in vertical section in Figure 1, Figure 6 is a front elevational view of a further form of the invention, Figure 7 is a side elevational view of the form of the invention shown in Figure 6, and Figure 8 is a detailed vertical elevational view of a portion of a modified form of truck and rail structure suitable for use with either of the form of the invention shown in the preceding figures.

Briefly described, this invention covers transportation means in which a balloon, and by this term I mean dirigible balloons and other forms of gas-bags (including carrying compartment), or an aeroplane (including carrying compartment), both while at rest or in motion is attached to rails as illustrated in the accompanying drawings. The rails may be of any shape whatsoever, provided they have an upper and an under surface, so that the wheels, while in contact with such upper and under surfaces, may be held and revolve as the vehicle moves forward or backward. The rails are attached to supports of any required strength, height or number to secure stability and to meet varying conditions of traffic, crossings, elevations, depressions, side winds, and other conditions. The supports are fastened into the ground, into the pavement, attached to the sides of buildings or to the tops of buildings.

The vehicles here described will be propelled by air propellers operated by gasoline engine or by electricity or by some other practicable source of power. Provision is made for power to be applied to the rail-engaging wheels where necessary, the power being derived from a gasoline engine or from electricity or other available source of power.

It is my intention to have the balloon of sufficient size and gas content to neutralize exactly, or to exceed to the smallest extent possible, or to not quite equal in lifting power the downward pull by gravity of the weight of the material used in the construction of the balloon and carrying compartment and the weight of the load (people, express or freight). It is the object also to have the aeroplane (when in sufficiently rapid motion to accomplish this result) exactly to neutralize or to exceed to the smallest extent possible or to not quite equal in lifting power the downward pull by gravity of the weight of the aeroplane, the carrying compartment, and the load (people, express or freight). This will be accomplished by proper regulation of the planes used in guiding the aeroplane up or down.

The momentum of the vehicle (when either balloon or aeroplane is used) will be checked when necessary by pressure being exerted against the rails.

Similar numerals refer to similar parts throughout the several views.

The gas-bag or compartment 1, which is intended to be filled with a suitable gas or other similar medium, is equipped with a passenger, freight, or other cargo-carrying compartment 4, and is also provided with a truck structure 2, including a suitable number of axles 12, which pass transversely through the bag or compartment 1, at right angles to its length. The axles are arranged in pairs, with the respective ones of each pair located on different horizontal planes. The outer ends of the axles 12 are provided with free wheels 7 which are suitably attached thereto. The truck structure 2 is formed at the outer ends of each pair of shafts 12, with journal box structures 21 that include bearing bushings 8 arranged above and below the shafts. Interposed between the outer faces of these bushings and the opposed walls of the journal box structures are springs 9, as best illustrated in Figures 1 to 3, inclusive. The outer side wall of each journal box structure 21 is provided with the vertical slots 11, through which the axles 12 movably extend.

Figures 2 and 3 show vertical axles upon which are mounted wheels 10, which are arranged so that the peripheries of the same will align with the outer face plane of the wheels 7.

Figures 1 and 5 show standards, columns, or other suitable supports 5 to which are secured the channel rails 6. Each rail is intended to be held so that its opposed channel portions are arranged one above the other. To connect the bag or compartment 1, and its passenger or cargo carrying compartment 4, to the rails 6 so that the former may travel along the latter, the wheels 7 of each pair of axles 12 are received within the channel portions of the rails and the opposing spring 9 for the respective axles will function to prevent or retard movement of the journal box structure 21 with respect to the axles 12. The wheels 10, which lie in horizontal planes, will bear against the web portions of the rails.

The wheels 7, their axles 12, and the springs 9, are intended to retard or take care of any vertical movement of the bag or compartment 1 with respect to the rails 6, while the wheels 10 are intended to take care of any lateral or horizontal thrust.

As stated heretofore, it is intended that the buoyancy or upward lift of the bag and the downward pull of gravity exerted on the bag by the transportation load, etc., be maintained of equal force, or as nearly so as possible. When the upward lift and the downward pull are equal, the springs 9 will hold the axles 12 so that the wheels 7 on the respective shafts are arranged in respect to the upper and lower channel portions of the rails 6 as illustrated in Figures 1, 2, and 4, namely, one wheel will ride in the groove of the lower channel portion while the other wheel will ride in the groove of the upper channel portion.

When the load in the compartment 4 produces a gravitational pull greater than the upward lift of the bag or compartment 1, the diagonally positioned pairs of springs 9 will function to prevent movement of the journal box structure 21 in a downward direction. The remaining diagonally positioned pairs of springs will function in a similar manner to prevent upward movement of the journal box structures 21 when the upward lift of the bag exceeds the transportation load.

In view of the above facts, it will be noted that at least one wheel of each pair of wheels will be riding upon its respective channel portion while the remaining wheel will be removed to a variable extent from the portion of its channel it normally bears against. However, unless the difference between the upward lift and the gravitational pull be great, the wheel lifted off of its channel portion will not be moved away from the same to such an extent that it would bear against the channel portion intended for the other wheel.

Fig. 5 shows the compartment 4 as being provided with a propeller 13. This element is merely intended to illustrate one type of propulsion means for the device.

Figures 6 and 7 show a further form of my invention which includes the aeroplane 15, having a suitable compartment for passengers, freight, etc., and wing structure possessing any desired amount of lifting surface, the effectiveness of which may be varied by adjusting the angularity or inclination of the planes. This aeroplane is provided with suitable running gear that includes transverse axles and journal boxes 21 for connecting the axles to the running gear. In this form of the invention single axles are used instead of the pairs of axles referred to in connection with Figures 1 to 5, inclusive. The manner of connecting or mounting these individual axles in the aeroplane journal boxes 21 is the same as the mounting illustrated in the former figures for either one of the shafts shown therein. The axles in this form of the invention are provided with free wheels 14 at each end thereof.

Figs. 6 and 7 show the wheels 14 riding in channeled rails 6, which are of the same general construction as the rails illustrated in the former figures. These wheels 14 are intended to be of a diameter less than the distance between the wheel-engaging surfaces of the opposed channel portions of the rails. In view of this fact, the wheels 14 will engage or ride upon either one or the other of the channel portions, depending upon whether the gravitational pull of the load or the upward lift of the wings of the aeroplane is the greater.

It is to be understood, of course, that the type of connection between the rails and the bag shown in Figs. 1 to 5, inclusive, may be substituted for the single axles and wheels illustrated as being used by the aeroplane structure, and vice versa.

Figure 8 is intended to illustrate a further form of vehicle truck and rail structure which, it is to be understood, may be used on either of the forms of vehicles previously referred to. This structure is intended to include journal boxes through which extend vertically spaced axles which are provided with either the grooved wheels 19, having flanges 20, as illustrated, or plane surfaced wheels. Regardless of which form of wheels is used, the tread surfaces thereof are intended to be spaced a suitable distance from each other so that one wheel only will engage the surfaces 16 or 17 of the rail 18. This figure also illustrates additional wheels which lie in horizontal planes and engage the outer vertical edge of the rail 18 to function in the same manner as described in connection with the wheels 10 shown in Figs. 2 and 3.

It is also to be understood that various changes in the shape, size, and arrangement of parts may be made without departing from the spirit of the invention or the scope of the subjoined claims.

Having thus described the invention, I claim:

1. In a device of the type described, the combination with an aircraft structure of rigid rails, each of which has at least three independent tread surfaces, and independent means carried by the aircraft structure for engaging each of said tread surfaces so that the said aircraft structure will be permitted to travel substantially in the horizontal plane of the rails and not be disturbed by lateral air pressure.

2. In a device of the type described, the combination with a self-sustaining aircraft structure, of rails, each having at least three independent tread surfaces, running gear movably mounted on said rails, and means for vertically yieldably connecting said aircraft structure to said running gear to permit limited raising and lowering movements of the said aircraft structure with respect to said rails.

3. In a device of the type described, the combination with an aircraft structure of rails, and means for connecting the aircraft structure to said rails, comprising journal box structures having resilient elements included therein, carried by the aircraft structure, and running gear movably connected to the rails and supporting said journal box structures through the resilient elements said resilient elements acting to retard vertical movement, in opposite directions, of the journal box structures relative to the running gear.

4. In a device of the type described, the combination with an aircraft structure intended to be used for transportion purposes and intended to be self-sustaining while in motion, of rigidly supported rails each having at least three independent tread surfaces, and running gear carried by the aircraft structure, and including independent wheels for each of the tread surfaces, to maintain the aircraft structure substantially in the horizontal plane of the rails and to prevent lateral movement of the said structure resulting from wind pressure.

5. In a device of the type described, the combination with an aircraft structure intended to be used for transportation purposes and to be self-sustaining while in motion, of rails, and means for connecting the aircraft structure to said rails, said means comprising journal box structures rigidly carried by the aircraft structure and having resilient elements included therein, and running gear movably connected to the rails, said running gear including axles connected to said journal box structures through the resilient elements, said resilient elements acting to retard vertical movement, in opposite directions, of the journal box structures relative to the rails.

6. In a device of the type described, the combination with a self-sustaining aircraft structure, of rigidly supported rigid rails, each of which has at least three independent tread surfaces, running gear carried by said aircraft structure including independent means for engaging each of said tread surfaces, and journal box structures having resilient elements included therein, said resilient elements acting to retard vertical movement, in opposite directions, of the journal box structures relative to the rails.

7. In a device of the type described, the combination with a self-sustaining aircraft structure, of rigidly supported rigid rails, each of which has at least three independent tread surfaces, running gear carried by said air craft structure including independent means for engaging each of said tread surfaces, so that the said aircraft structure will be permitted to travel substantially in the horizontal plane of the rails and not be disturbed by lateral wind pressure, and journal box structures having resilient elements included therein, said resilient elements acting to retard vertical movement, in opposite directions of the journal box structures relative to the rails.

8. In a device of the type described, the combination with a structure intended to be self-sustaining while in motion, of rigidly supported rigid rails, each of which has at least three independent tread surfaces, running gear carried by the self-sustaining structure, including independent means for engaging each of said tread surfaces, so that said structure will be permitted to travel substantially in the horizontal plane of the rails and not be disturbed by lateral wind pressure, and journal box structures having resilient elements included therein, said resilient elements acting to retard vertical movement, in opposite directions, of the journal box structures relative to the rails.

ELMER GEORGE PETERSON.